US010534795B2

(12) United States Patent
Saxena

(10) Patent No.: US 10,534,795 B2
(45) Date of Patent: Jan. 14, 2020

(54) MAINTAINING CONSISTENT SUBSCRIBER DATA ON GEO-REDUNDANT SUBSCRIBER DATABASES

(71) Applicant: HEWLETT PACKARD ENTERPRISE DEVELOPMENT LP, Houston, TX (US)

(72) Inventor: Ravi Saxena, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 155 days.

(21) Appl. No.: 15/652,667

(22) Filed: Jul. 18, 2017

(65) Prior Publication Data

US 2018/0018380 A1  Jan. 18, 2018

(30) Foreign Application Priority Data

Jul. 18, 2016 (IN) .............................. 201641024559

(51) Int. Cl.
    *G06F 17/30* (2006.01)
    *G06F 16/27* (2019.01)
    *G06F 16/23* (2019.01)
    *H04L 29/08* (2006.01)

(52) U.S. Cl.
    CPC .......... *G06F 16/27* (2019.01); *G06F 16/2365* (2019.01); *H04L 67/1097* (2013.01)

(58) Field of Classification Search
    CPC .................................................. G06F 13/4059
    USPC .................................................. 707/694, 803
    See application file for complete search history.

(56) References Cited

U.S. PATENT DOCUMENTS

| 6,286,042 B1 | 9/2001 | Hasselberg et al. |
| 8,402,147 B2 | 3/2013 | Bondy |
| 8,724,456 B1* | 5/2014 | Hong ...................... G06F 11/00 370/225 |
| 2003/0093431 A1 | 5/2003 | Cooke et al. |
| 2010/0100614 A1 | 4/2010 | Qiu et al. |
| 2012/0069817 A1* | 3/2012 | Ling ..................... H04W 36/14 370/331 |
| 2012/0224496 A1* | 9/2012 | Shao ................... H04L 65/4015 370/248 |
| 2015/0143474 A1* | 5/2015 | Vallee ................. G06F 21/6245 726/4 |

OTHER PUBLICATIONS

Nortel Networks, "Method of Procedure GSM18 HLR Subscriber Data Migration," Mar. 22, 2005, pp. 1-60.

* cited by examiner

*Primary Examiner* — Baoquoc N To
(74) *Attorney, Agent, or Firm* — Hewlett Packard Enterprise Patent Department

(57) ABSTRACT

Examples describe mechanisms for maintaining consistent subscriber data on geo-redundant subscriber databases. In an example, a request to perform an operation related to subscriber data may be received on a subscriber database, wherein the subscriber database may be a geo-redundant deployment of a separate subscriber database. The connectivity status of a synchronization link between the subscriber database and the separate subscriber database may be determined. In response to the determination that the connectivity status of the synchronization link between the subscriber database and the separate subscriber database is disconnected, the request to perform the operation related to the subscriber data on the subscriber database may be denied.

13 Claims, 4 Drawing Sheets

MAINTAINING CONSISTENT SUBSCRIBER DATA ON GEO-REDUNDANT SUBSCRIBER DATABASES

BACKGROUND

A telecom network may be used by millions of subscribers. A telecom service provider may store subscriber-related information in a database or a plurality of databases.

BRIEF DESCRIPTION OF THE DRAWINGS

For a better understanding of the solution, examples will now be described, purely by way of example, with reference to the accompanying drawings, in which.

DETAILED DESCRIPTION

In a telecom network, subscriber data may be stored in a database. In an example, subscriber data on two or more databases may be synchronized for redundancy. In the event of failure of one subscriber database, another database that maintains synchronized subscriber data may be used.

There may be a scenario when the synchronization link i.e. a communication link to synchronize subscriber data between two databases may be disconnected or unavailable (for example, due to a disconnected cable). In such case, if an operation related to subscriber data (for example, an update) is performed on one of the databases, it may not get reflected in the other redundant database. This may lead to inconsistent subscriber data on the databases. During this state, if a subscriber-related request is received by the telecom network, the request may get processed differently depending on the database used for serving the request since the subscriber data may not be same on the related databases. Needless to say, this is not a desirable scenario.

To address these issues, the present disclosure describe mechanisms for maintaining consistent subscriber data on geo-redundant subscriber databases. In an example, a request to perform an operation related to subscriber data may be received on a subscriber database, wherein the subscriber database may be a geo-redundant deployment of a separate subscriber database. A determination may be made regarding the connectivity status of a synchronization link between the subscriber database and the separate subscriber database. In response to the determination that the connectivity status of the synchronization link between the subscriber database and the separate subscriber database is disconnected, the request to perform the operation related to the subscriber data on the subscriber database may be denied.

Figure 1:
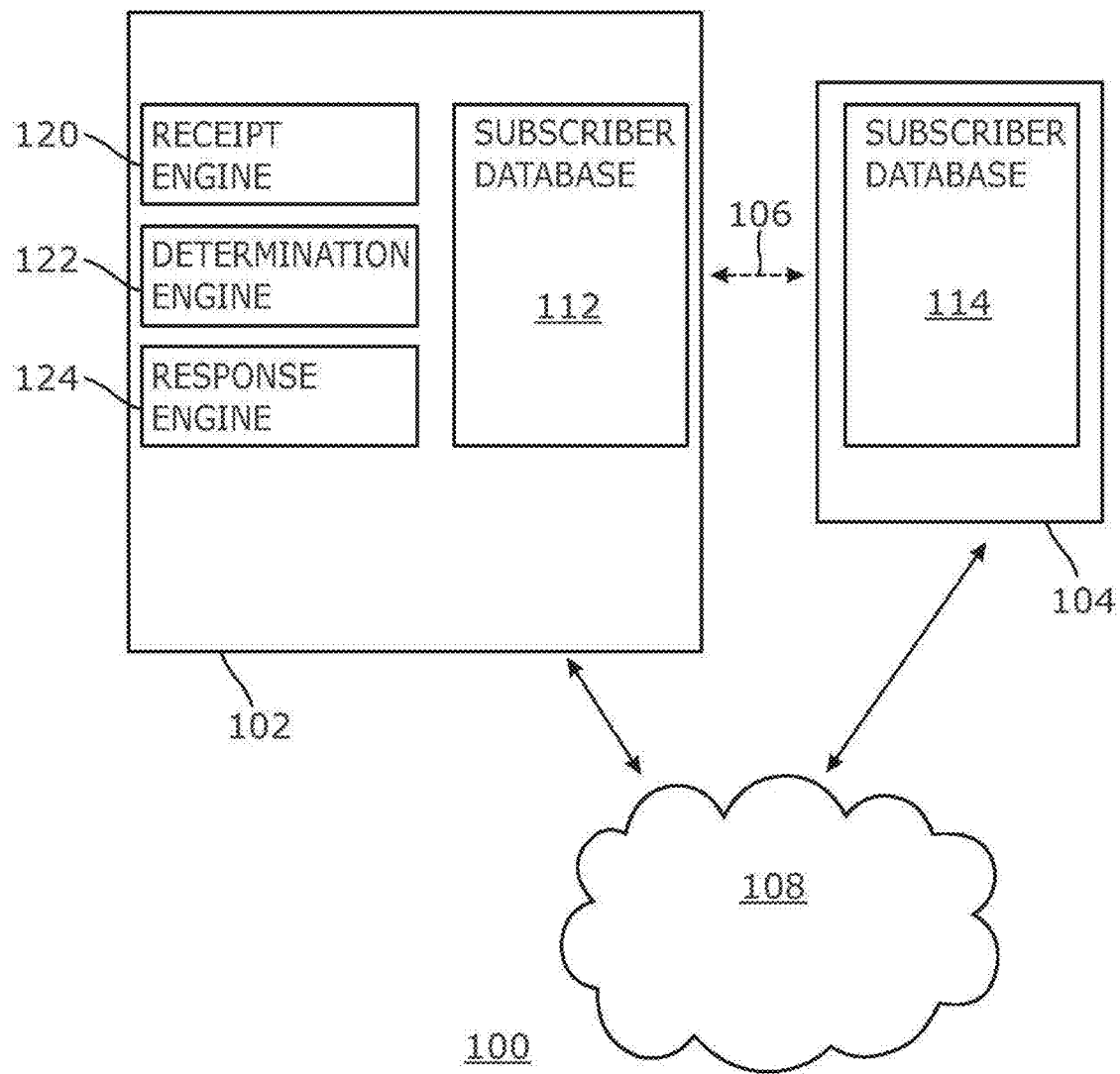
FIG. 1 is a block diagram of an example system for maintaining consistent subscriber data on geo-redundant subscriber databases.

FIG. 1 is a block diagram of an example network system 100 for maintaining consistent subscriber data on geo-redundant subscriber databases. In an example, network system 100 may include nodes 102 and 104. As used herein, a "node" may be a computing device (i.e. includes at least one processor), a storage device, a network device, or any combination thereof. Although two nodes are shown in FIG. 1, other examples of this disclosure may include more than two nodes.

In an example, nodes 102 and 104 may each be a computing device such as a server, a desktop computer, a notebook computer, a tablet computer, a mobile phone, a personal digital assistant (PDA), a virtual server, and the like.

In an example, network system 100 may include an internal network 106 and an external network 108. The internal network 106 may be used to communicatively couple nodes 102 and 104. The internal network 106 may be a wireless or wired network. The internal network 106 may include, for example, a Local Area Network (LAN), a Wireless Local Area Network (WAN), a Metropolitan Area Network (MAN), a Storage Area Network (SAN), a Campus Area Network (CAN), or the like. Further, the internal network 106 may be a public network (for example, the Internet) or a private network (for example, an intranet).

In an example, nodes 102 and 104 may each be in communication with the external network 108. The external network 108 may be a telecommunication network. The telecommunication network may include a wired telecom network (for example, Public Switched Telephone Network (PSTN)) or a wireless telecom network (for example, 2G network, 3G network, 4G network, and Internet Protocol Multimedia System (IMS)). In an example, the internal network 106 and the external network 108 may be a single network.

Nodes 102 and 104 may be located at different sites of network system 100. For example, node 102 may be located at a first site, and node 104 may located at a second site. The first site and the second site may be represent two different geographical locations. For example, the first site and the second site may be, for example, two different countries, states, or buildings.

Nodes 102 and 104 may each include a subscriber database (112 and 114). The subscriber databases 112 and 114 may each include subscriber data. Examples of the subscriber databases may include Home Location Register (HLR) databases, Home Subscriber Server (HSS) databases, and User Data Repository (UDR) databases. The subscriber data may include, for example, details of mobile phone subscribers of a telecommunication network. Such details may include, for example, a mobile number assigned to a subscriber, services subscribed by a subscriber, GPRS settings that allow a subscriber to access packet services, current location of a subscriber, services assigned to a subscriber (for example, call waiting, call divert, etc.).

In an example, subscriber databases 112 and 114 on nodes 102 and 104 respectively may be geographically redundant (or geo-redundant) subscriber databases. In other words, nodes 102 and 104 may be located at different geographical locations and subscriber data on the subscriber databases 112 and 114 may be same i.e. subscriber data on the subscriber database 112 may be a copy of subscriber data on the subscriber database 114. A synchronization link between nodes 102 and 104 may be used to synchronize subscriber data on subscriber databases 112 and 114. In an example, the synchronization link may be on the internal network.

In an example, nodes 102 and 104 may each include a receipt engine 120, a determination engine 122, and a response engine 124. For the sake of simplicity, node 102 in FIG. 1 is shown to include receipt engine 120, determination engine 122, and response engine 124, but in other examples, other nodes of network system 100 (for example, 104) may include these engines as well. A node (for example, 102) may be implemented by at least one computing device and may include at least engines 120, 122, and 124, which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of a node (for example, 102). In some examples, the at least one machine-readable storage medium may store instructions that, when executed by the at least one processing resource, at least partially implement some or all engines of a node (for example, 102). In such examples, a node (for example, 102) may include the at least one machine-readable storage medium storing the instructions and the at least one processing resource to execute the instructions.

The functionalities performed by receipt engine 120, determination engine 122, and response engine 124 are described in reference to FIG. 2 below.

Figure 2:
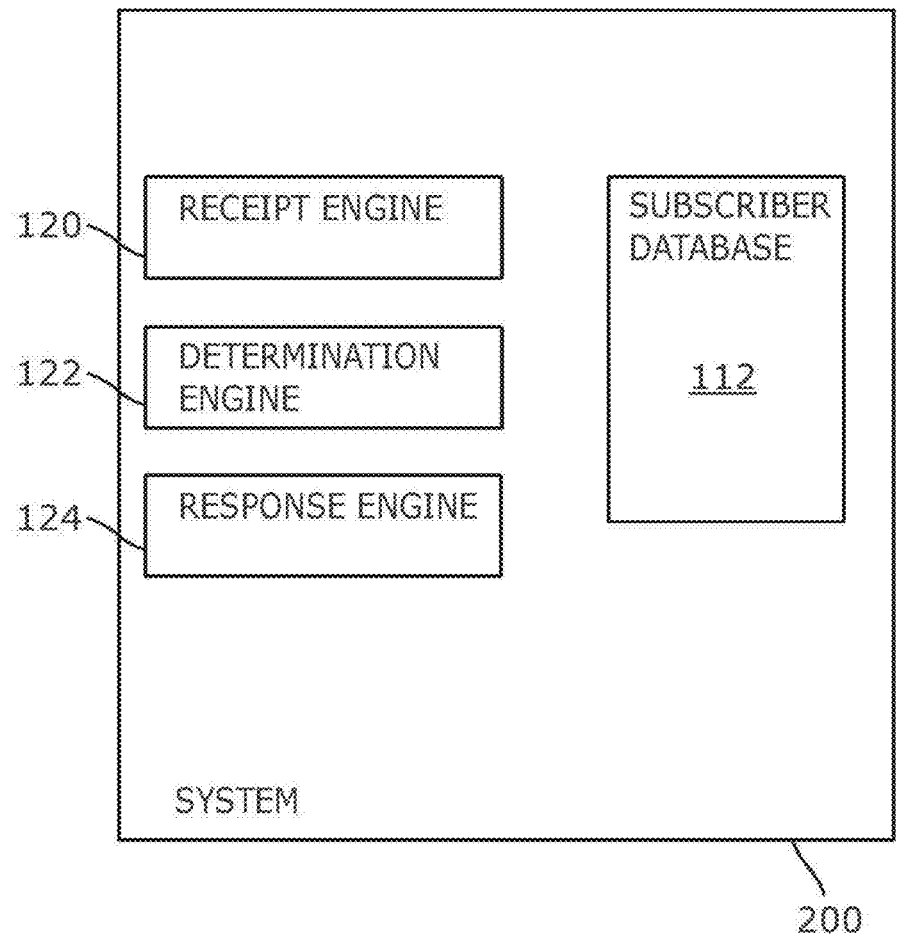
FIG. 2 is a block diagram of an example computing system for maintaining consistent subscriber data on geo-redundant subscriber databases.

FIG. 2 is a block diagram of an example computing system 200 for maintaining consistent subscriber data on geo-redundant subscriber databases. In an example, computing system 200 may be analogous to a node (for example, 102 or 104) of FIG. 1, in which like reference numerals correspond to the same or similar, though perhaps not identical, components. For the sake of brevity, components or reference numerals of FIG. 2 having a same or similarly described function in FIG. 1 are not being described in connection with FIG. 2. Said components or reference numerals may be considered alike.

In an example, system 200 may represent any type of computing device capable of reading machine-executable instructions. Examples of the computing device may include, without limitation, a server, a desktop computer, a notebook computer, a tablet computer, a thin client, a mobile device, a personal digital assistant (PDA), a phablet, a virtual server, and the like. In an example, system 200 may be a node in a telecommunication system.

System 200 may include a subscriber database 112 that may include subscriber data. In an example, the subscriber data may include data related to subscribers of a telecom network. The subscriber database may be maintained by a telecom service provider. In an example, the subscriber database may be a geo-redundant deployment of a separate subscriber database, which may be present on a separate system.

In an example, system 200 may include a receipt engine 120, a determination engine 122, and a response engine 124.

Receipt engine 120 may be used to receive a request to perform an operation related to subscriber data on the subscriber database. The request may be provided by a user. Example requests may include a request to create subscriber data, a request to modify or update subscriber data, and a request to delete subscriber data.

Receipt engine 120 may provide a user interface that may be used for receiving a request to perform an operation related to subscriber data. Example user interfaces may include a Command Line Interface (CLI) and a Graphical User Interface. In an example, further to receiving the request, receipt engine may communicate the request to determination engine.

Determination engine 122 may determine the connectivity status of a synchronization link between the subscriber database ("first subscriber database") and a separate subscriber database ("second subscriber database"). In an example, the second subscriber database may be hosted on a separate computer system ("second system"), and may include same subscriber data which may be present on the subscriber database of system 200. In other words, the second subscriber database may include a copy of subscriber data on the subscriber database.

A synchronization link between system 200 and the second system may be used to synchronize subscriber data between the subscriber database and the second subscriber database. Determination engine 122 may determine a connectivity status of the synchronization link. Determination engine 122 may determine whether the synchronization link is functioning or disconnected (for example, due to a disconnected cable or a faulty network device). In this regard, determination engine may, for example, send a message(s) to the second system to determine the connectivity status of the synchronization link. Determination engine 122 may communicate the connectivity status of the synchronization link to response engine 124.

Response engine 124 may analyze the connectivity status of the synchronization link. If the connectivity status of the synchronization link between system 200 and the second system is disconnected, response engine may deny the request to perform an operation related to subscriber data on the subscriber database. For example, a request for creating subscriber data, updating subscriber data, or deleting subscriber data on the subscriber database may not be allowed on system 200.

On the other hand, if the connectivity status of the synchronization link between system 200 and the second system is functioning, response engine 124 may allow a request to perform an operation related to subscriber data on the subscriber database. For example, a user request for creating subscriber data, updating subscriber data, or deleting subscriber data on the subscriber database may be allowed on system 200. Further to the performance of the requested operation, subscriber data on the subscriber database on system 200 may be synchronized with subscriber data on the second subscriber database on the second system.

In an example, if the connectivity status of the synchronization link between system and the second system is functioning, determination engine 122 may perform a further determination. In an example, determination engine 112 may determine a number of operations performed on the subscriber database that are awaiting synchronization to the second subscriber database. These operations may relate to, for example, creation of subscriber data, modification of subscriber data, or deletion of subscriber data on the subscriber database that are yet to be synchronized to the second subscriber database.

Further to the determination, response engine 124 may analyze the identified number. If the number of operations on the subscriber database that are awaiting synchronization to the second subscriber database are above a pre-defined threshold, response engine 124 may deny a request to perform an operation related to the subscriber data on the subscriber database. Thus, response engine may not allow the request even if the connectivity status of the synchronization link between system 200 and the second system is functioning. However, if the number of operations on the subscriber database that are awaiting synchronization to the second subscriber database are below a pre-defined threshold, response engine may allow a requested operation.

In another example, if the connectivity status of the synchronization link between system 200 and the second system is functioning, determination engine 122 may perform a further determination. In an example, determination engine 122 may determine usage of a system resource(s) on system 200 that hosts the subscriber database. Example system resources may include a memory resource, a processing resource, a storage resource, and a network resource.

Further to the determination, response engine 124 may analyze the usage of the system resource under determination. If the usage of the system resource on system 200 that hosts the subscriber database is above a pre-defined threshold, response engine 124 may deny a request to perform an operation related to the subscriber data on the subscriber database. However, if the usage of the system resource is below a pre-defined threshold, response engine 124 may allow a requested operation.

Figure 3:
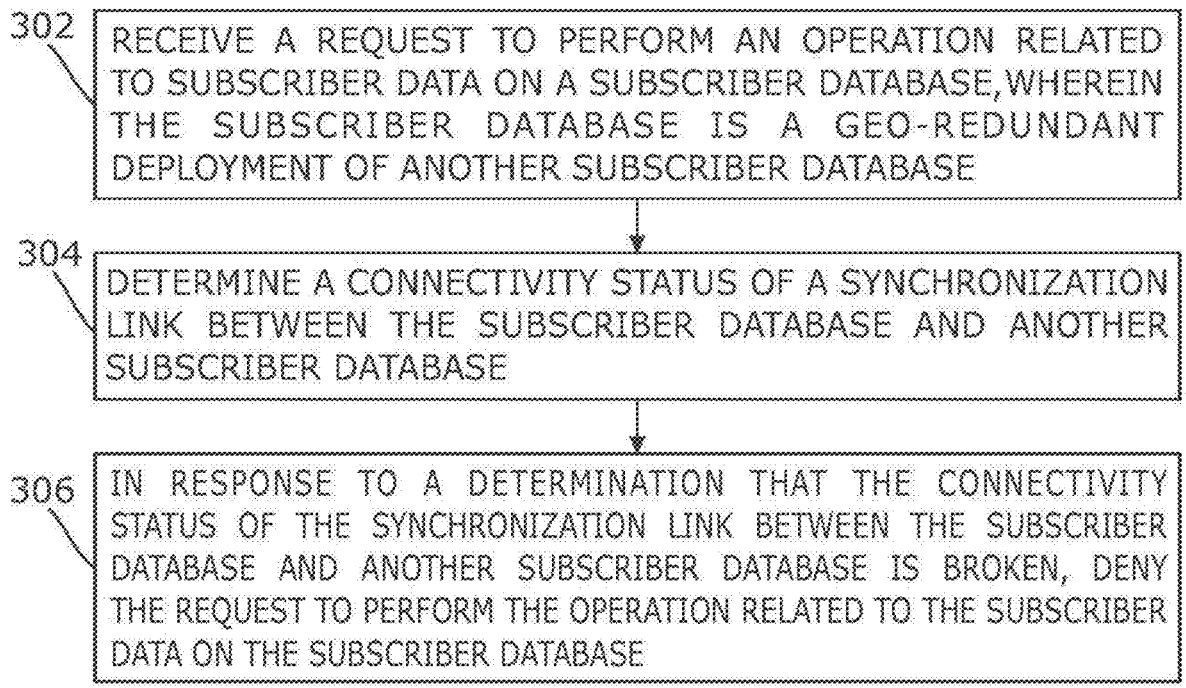
FIG. 3 is a flowchart of an example method of maintaining consistent subscriber data on geo-redundant subscriber databases.

FIG. 3 is a flowchart of an example method 300 of maintaining consistent subscriber data on geo-redundant subscriber databases. The method 300, which is described below, may be executed on a computing device such as a node (for example, 102 or 104) of FIG. 1 or system of FIG. 2. However, other computing devices may be used as well. At block 302, a request may be received to perform an operation related to subscriber data on a subscriber database. The subscriber database may be a geo-redundant deployment of a separate subscriber database. At block 304, a connectivity status of a synchronization link between the subscriber database and the separate subscriber database may be determined. At block 306, in response to the determination that the connectivity status of the synchronization link between the subscriber database and the separate subscriber database is disconnected, the request to perform the operation related to the subscriber data on the subscriber database may be denied.

Figure 4:
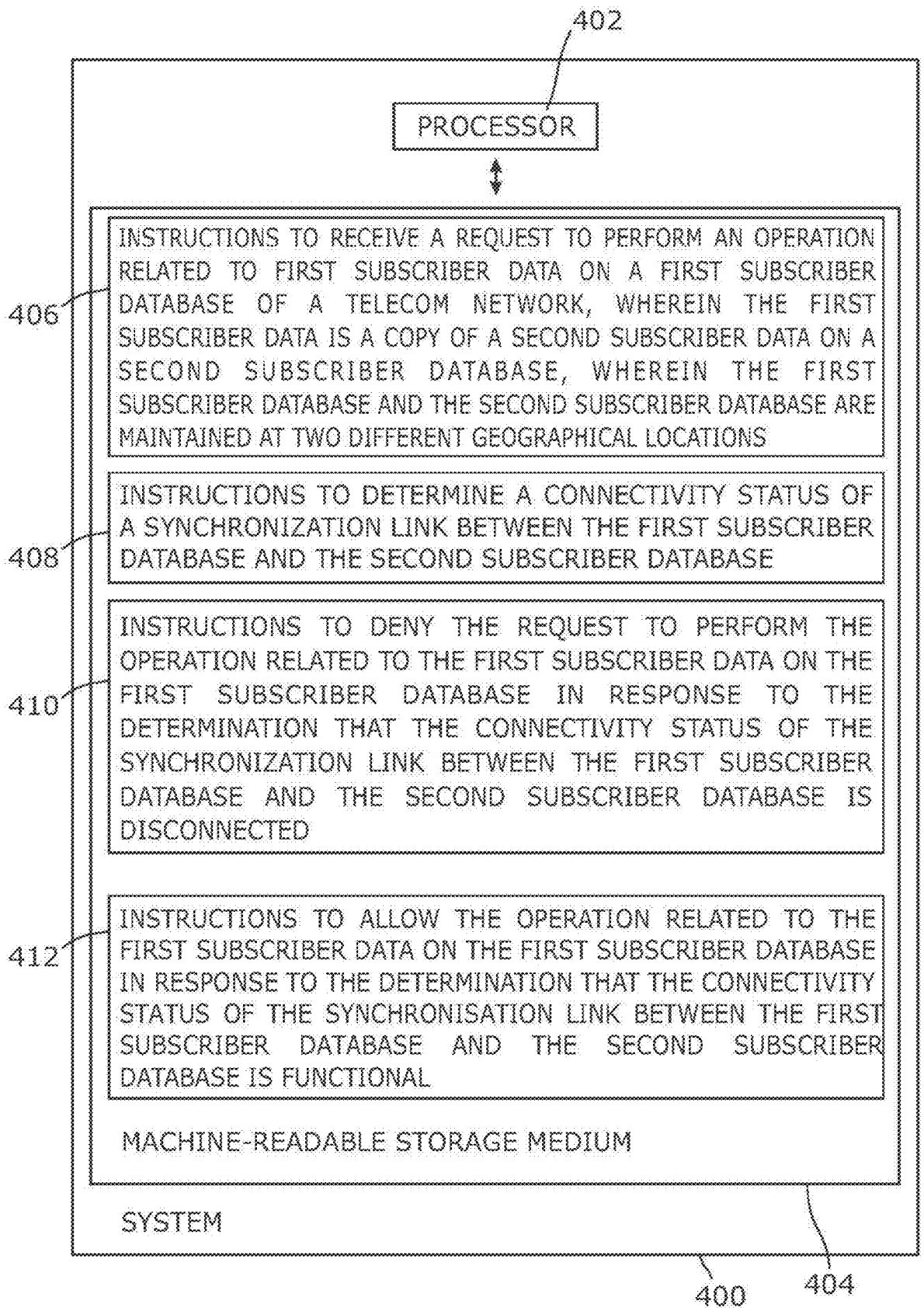
FIG. 4 is a block diagram of an example system including instructions in a machine-readable storage medium for maintaining consistent subscriber data on geo-redundant subscriber databases.

FIG. 4 is a block diagram of an example system 400 including instructions in a machine-readable storage medium for maintaining consistent subscriber data on geo-redundant subscriber databases.

System 400 includes a processor 402 and a machine-readable storage medium 404 communicatively coupled through a system bus. In some examples, system 400 may be analogous to a node (for example, 102 and 104) of FIG. 1 or system 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 404 may store instructions 406, 408, and 410. In an example, instructions 406 may be executed by processor 402 to receive a request to perform an operation related to first subscriber data on a first subscriber database of a telecom network, wherein the first subscriber data is a copy of a second subscriber data on a second subscriber database, wherein the first subscriber database and the second subscriber database are maintained at two different geographical locations. Instructions 408 may be executed by processor 402 to determine a connectivity status of a synchronization link between the first subscriber database and the second subscriber database. Instructions 410 may be executed by processor 402 to deny the request to perform the operation related to the first subscriber data on the first subscriber database in response to the determination that the connectivity status of the synchronization link between the first subscriber database and the second subscriber database is disconnected. Instructions 412 may be executed by processor 402 to allow the operation related to the first subscriber data on the first subscriber database in response to the determination that the connectivity status of the synchronization link between the first subscriber database and the second subscriber database is functioning, For the purpose of simplicity of explanation, the example method of FIG. 3 is shown as executing serially, however it is to be understood and appreciated that the present and other examples are not limited by the illustrated order. The example systems of FIGS. 1, 2 and 4, and method of FIG. 3 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution.

The invention claimed is:

1. A method of maintaining consistent subscriber data on geo-redundant subscriber databases, comprising:
receiving a request to perform, via a processor, an operation related to subscriber data on a subscriber database, wherein the subscriber database is a geo-redundant deployment of a separate subscriber database;
determining, via the processor, a connectivity status of a synchronization link between the subscriber database and the separate subscriber database;
in response to the determination that the connectivity status of the synchronization link between the subscriber database and the separate subscriber database is disconnected, denying the request, via the processor, to perform the operation related to the subscriber data on the subscriber database; and in response to the determination that the connectivity status of the synchronization link between the subscriber database and the separate subscriber database is functioning, allowing the operation related to the subscriber data on the subscriber database.

2. The method of claim 1, further comprising:
synchronizing the subscriber data on the subscriber database with subscriber data on the separate subscriber database.

3. The method of claim 1, wherein the operation includes at least one of:
creating subscriber data; updating subscriber data; and deleting subscriber data on the subscriber database.

4. A system to maintain consistent subscriber data on geo-redundant subscriber databases, comprising:
a processor;
a non-transitory machine-readable storage medium including instructions that when executed by the processor, cause the processor to:
receive a request to perform an operation related to subscriber data on a subscriber database, wherein the subscriber database is a geo-redundant deployment of a separate subscriber database on a separate system;
determine a connectivity status of a link to the separate system, wherein the link is used to synchronize data between the subscriber database and the separate subscriber database;
deny the request to perform the operation related to the subscriber data on the subscriber database in response to the determination that the connectivity status of the synchronization link to the separate system is disconnected; and
allow the operation related to the subscriber data on the subscriber database in response to the determination that the connectivity status of the synchronization link between the subscriber database and the separate subscriber database is functional.

5. The system of claim 4, further comprising instructions to:
determine a number of operations on the subscriber database that await synchronization to the separate subscriber database; and
in response to the determination that the number of operations on the subscriber database that await synchronization to the separate subscriber database are above a pre-defined threshold, deny the request to perform the operation related to the subscriber data on the subscriber database.

6. The system of claim 4, further comprising instructions to:
determine usage of a system resource on the system; and
in response to the determination that the usage of the system resource on the system is above a pre-defined threshold, deny the request to perform the operation related to the subscriber data on the subscriber database.

7. The system of claim 4, wherein both the subscriber database and the separate subscriber database include one of a Home Location Register (HLR) database, a Home Subscriber Server (HSS) database, and a User Data Repository (UDR) database.

8. The system of claim 4, wherein the subscriber data includes at least one of a phone number assigned to a subscriber, services subscribed by a subscriber, current location of a subscriber, and services provided to a subscriber.

9. A non-transitory machine-readable storage medium comprising instructions to maintain consistent subscriber data on geo-redundant subscriber databases, the instructions executable by a processor to:
receive a request to perform an operation related to first subscriber data on a first subscriber database of a telecom network, wherein the first subscriber data is a copy of a second subscriber data on a second subscriber database, wherein the first subscriber database and the second subscriber database are maintained at two different geographical locations;
determine a connectivity status of a synchronization link between the first subscriber database and the second subscriber database;
in response to the determination that the connectivity status of the synchronization link between the first subscriber database and the second subscriber database is disconnected, deny the request to perform the operation related to the first subscriber data on the first subscriber database; and
in response to the determination that the connectivity status of the synchronization link between the first subscriber database and the second subscriber database is functional, allow the operation related to the first subscriber data on the first subscriber database.

10. The storage medium of claim 9, further comprising instructions to:
in response to the determination that the connectivity status of the synchronization link between the first subscriber database and the second subscriber database is functional, determine a number of operations on the first subscriber database that await synchronization to the second subscriber database; and
in response to the determination that the number of operations on the first subscriber database that await synchronization to the second subscriber database are above a pre-defined threshold, deny the request to perform the operation related to the first subscriber data on the first subscriber database.

11. The storage medium of claim 10, further comprising instructions to:
in response to the determination that the number of operations on the first subscriber database that await synchronization to the second subscriber database are below a pre-defined threshold, allow the operation related to the first subscriber data on the first subscriber database.

12. The storage medium of claim 9, further comprising instructions to:
in response to the determination that the connectivity status of the synchronization link between the first subscriber database and the second subscriber database is functional, determine usage of a system resource on a system that hosts the first subscriber database; and
in response to the determination that the usage of the system resource on the system that hosts the first subscriber database is above a pre-defined threshold, deny the request to perform the operation related to the first subscriber data on the first subscriber database.

13. The storage medium of claim 12, further comprising instructions to:
in response to the determination that the usage of the system resource on the system that hosts the first subscriber database is below a pre-defined threshold, allow the request to perform the operation related to the first subscriber data on the first subscriber database.

\* \* \* \* \*